Jan. 1, 1935.  J. H. VAN WAGENEN  1,986,306
BRAKE
Original Filed Nov. 26, 1926  2 Sheets-Sheet 1
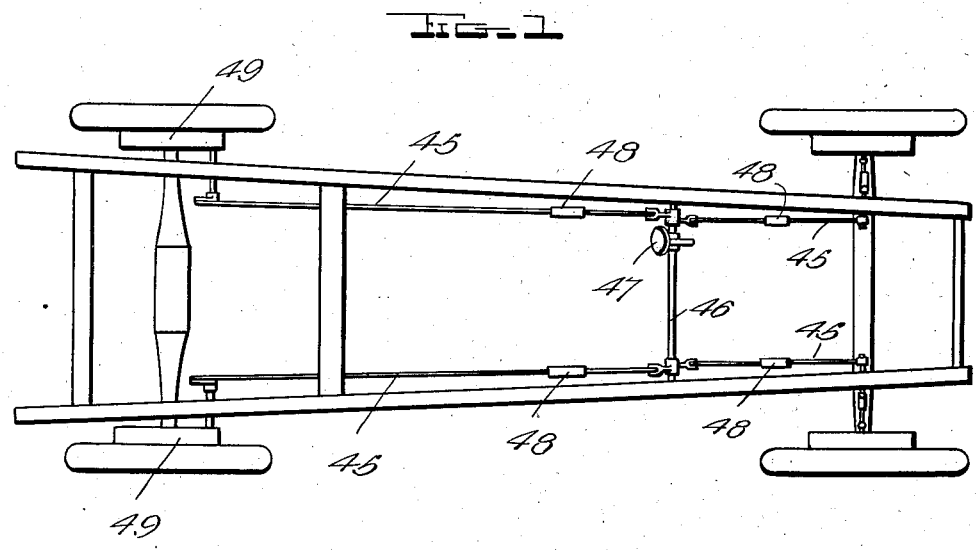
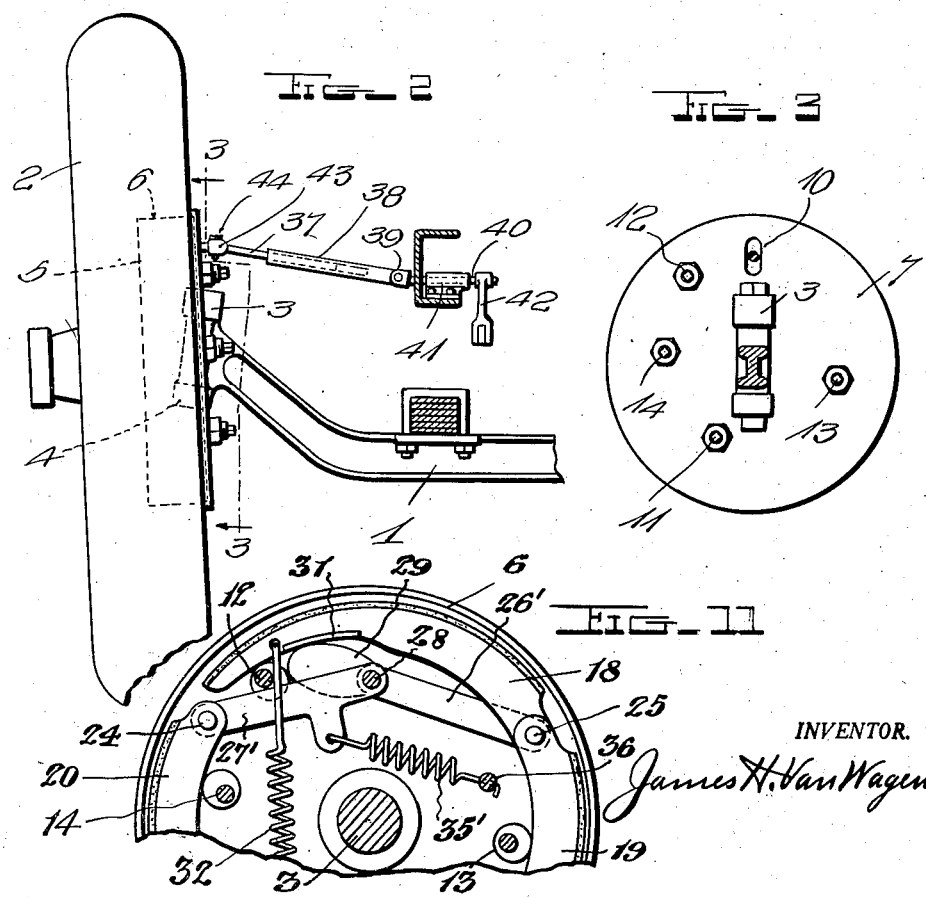
INVENTOR.
James H. Van Wagenen Jan. 1, 1935.  J. H. VAN WAGENEN  1,986,306
BRAKE
Original Filed Nov. 26, 1926  2 Sheets-Sheet 2
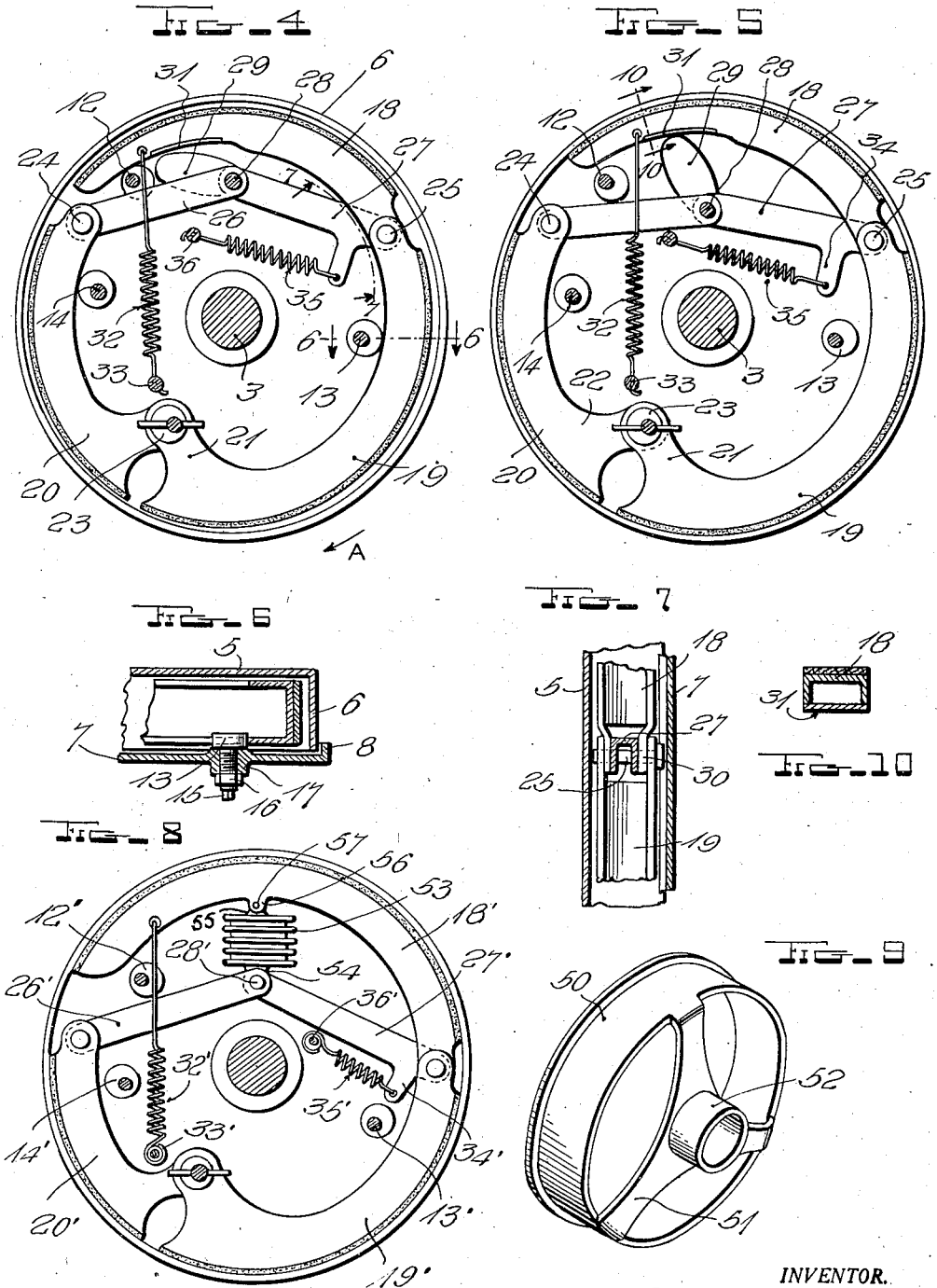
INVENTOR.
James H. Van Wagenen Patented Jan. 1, 1935

1,986,306

UNITED STATES PATENT OFFICE 1,986,306

BRAKE

James H. Van Wagenen, Washington, D. C.

Original application November 26, 1926, Serial No. 150,912. Divided and this application June 12, 1930, Serial No. 460,700

22 Claims. (Cl. 188—78)

This invention relates to brakes and more particularly to brakes of the servo or self-energizing type, and is a division of my co-pending application Serial No. 150,912 filed November 26, 1926 (Patent No. 1,774,684, September 2, 1930).

Heretofore it has been the practice to utilize the momentum of the vehicle at the initial application of the brake member to the rotating drum. As a result the braking force is greatest, for a given movement of the brake applying means, at the inception of the braking action. It follows that the operation of the servo or momentum brake has been too quick and positive. By reason of this disadvantage that inheres in servo brakes as now constructed, it is well nigh impossible to obtain a smooth and progressively increasing retardation fully controlled by the operator. This disadvantage obtains not only in a single "wrap" band brake but also in those employing a plurality of pivoted shoes. I propose to eliminate the disadvantages now obtaining in servo brakes and by employing a new mode of operation to improve brakes generally and to simplify their construction.

It is an object of this invention to provide a method for retarding the speed of a rotating member by which the momentum of this member is utilized as part of the brake applying force.

It is another object of my invention to provide a method of braking whereby the application of the force due to subsequent momentum may be made after an initial braking action has been initiated.

It is a further object of this invention to provide a brake comprising a plurality of members which are successively applied to the rotating drum.

Yet another object is to provide a self-contained brake assembly which may be installed, removed or replaced as a unit.

A still further object is to insure a close frictional contact between the brake drum and all parts of the retarding brake member.

An additional object is to provide a method of adjustment whereby the retarding member may be accurately fitted to the drum during installation or after wear between the operating parts has occurred.

With these and other equally important objects in view, the invention resides in the methods of braking operation and in the constructions devised to effectuate this method which will be hereinafter described.

In order that the invention may be readily understood, structural embodiments of it are disclosed and described in detail. It is to be understood, however, that this disclosure is merely for purposes of exemplification; for since the essential features of the invention may be incorporated in other specific mechanical structures, I do not intend to have the spirit of the invention restricted short of the comprehensive scope as defined in the appended claims.

To facilitate an understanding of the invention, I have shown it as embodied in an automotive vehicle and shown in the accompanying drawings, in which:

Figure 1 is a diagrammatic view of a four wheel brake illustrating the operation of the applying mechanisms;

Fig. 2 is an elevation of the brake mounted on a dirigible wheel;

Fig. 3 is a sectional view of a portion of the brake taken on the line 3—3 of Fig. 2;

Fig. 4 is a view of the interior of the brake drum, showing the brake in inoperative position;

Fig. 5 is a view similar to Fig. 4 showing the brake assembly in applied position;

Fig. 6 is a detail vew of one of the brake positioning elements, taken on line 6—6 of Figure 4.

Fig. 7 is a section on the line 7—7 of Fig. 4;

Fig. 8 is a side elevation of a modification of the device shown in Fig. 4;

Fig. 9 is a perspective view of the adjusting drum;

Fig. 10 is a cross section on line 10—10 of Fig. 5.

Figure 11 is a detail view of a modified form of the invention.

In the drawings the corresponding parts in the several views are designated by the same numerals.

As shown in the drawings, 1 is a front axle on which is mounted a wheel 2 through the intermediacy of a spindle 3 and king pin 4. Rigidly affixed to the wheel 2 is a brake drum 5. This brake drum is provided with the usual peripheral flange 6. Rigidly affixed to the spindle and enclosing the brake drum and peripheral flange is a backing plate 7. This plate may be formed with a lip 8 enclosing the peripheral rim of the drum, to protect the brake mechanism from mud, dust and water.

Although I have shown the brake mechanism as mounted on a front wheel designed for center point steering, it is to be understood that the brake assembly may be applied to a wheel which is mounted parallel to the axis of the king pin.

The backing plate 7 is formed with an oval shaped aperture 10 through which may protrude the shaft for the brake applying means. This backing plate is also apertured to receive an eccentric anchor pin 11 and eccentric brake positioning elements 12, 13 and 14. Each of these positioning elements protrude through the backing plate and on the outside of this plate are provided with a squared end 15 or any equivalent means for rotating the shaft. This element carrying the eccentric may be locked in any position of adjustment by the locking nut 16. It will be seen from an inspection of Figure 6 that the eccentric may be adjusted by unscrewing the nut 16 then turning the squared end 15 by any suitable tool until the desired position of the eccentric is obtained. The eccentric is then locked in this position by screwing down the nut 16 which in conjunction with the shouldered bushing 17 will lock the device in its adjusted position.

The brake unit comprises three shoes 18, 19 and 20. The shoes 19 and 20 may be identically constructed and hence interchangeable, although I prefer to provide the shoe 19 with a greater circumferential length. These shoes are preferably of channel-shaped cross section, although it will be appreciated that, if found desirable, they may be formed of T-shaped cross section or any other suitable form. Each of the shoes 19 and 20 are provided with radial extensions 21 and 22 respectively. These extensions are apertured to seat on the eccentric anchor pin 23. The pin 23 has an integral squared extension 11 protruding beyond the backing plate by which it may be rotated to adjust the circumferential position of the shoes, as will be explained more fully hereinafter.

The other end of each of the shoes 19 and 20 are apertured to receive pivot pins 24 and 25 respectively. Adjacent these pivots the top flanges of each of the shoes 19 and 20 are cut away, as shown in Fig. 4, so that the radial flanges extend beyond the termination of the top flange and form, in effect, supporting arms which mount the pivots 24 and 25.

As shown in Figs. 4 and 5, the pivot pins are adapted to pivotally support the toggle members 26 and 27. These toggle arms are preferably of channel shaped cross section and like the shoes may be cast or stamped. In a manner similar to the construction of the shoes 19 and 20 the top flange of each of the toggle arms may be cut away and the radial flanges inwardly offset and extended to form supporting arms which nest within the supporting arms of the shoes 19 and 20, as shown in Fig. 7.

The toggle arms 26 and 27 are pivoted to each other at 28. This pivot 28, as will appear more clearly hereinafter, serves also as a shaft for the cam member 29. The web of the toggle arm 26 is cut away adjacent this pivot and thereby allows movement of the cam well into the longitudinal plane of the toggle member so that it is in effect housed within the toggle arm when in inoperative position.

The servo shoe 18 is pivoted at 25 to the secondary shoe 19. I prefer to cut away a portion of the braking flange and to offset the extended supporting arms 30 so that they are interposed between the similar flanges on the shoe 19 and the toggle 27. This servo shoe is formed with a cam bearing surface 31 struck on an arc eccentric to the braking flange of the shoe, as shown in Fig. 4. By reason of the curvature of the thrust segment 31, the movement of the shaft 28 is greatest at the initial application of the brake applying means, that is to say, after the inception of the braking action a given angle of throw of the cam will result in a progressively smaller radial movement of the shaft 28. Attached to the shoe 18, adjacent its free end, is a spring 32. The other end of the spring 32 is engaged and held by a plug 33 formed integral with or separately from the backing plate.

The toggle arm 27, which is pivoted directly to the servo shoe 18 and the secondary shoe 19, is formed with an integral depending arm 34. The lower portion of this arm is apertured to receive one end of a spring 35. The other end of this spring is held in a plug 36 similar in structure and function to the plug 33. Positioned behind each of the shoes 18, 19 and 20, and mounted for rotation in the backing plate, are the eccentric members 12, 13 and 14. These members serve to determine the inoperative position of all of the brake shoes, in a manner to be more particularly described.

In Fig. 2, I have shown a brake operating mechanism for a front wheel brake. It is to be understood that this is merely an example of any suitable applying means for a rotating brake applying shaft on a front wheel, as I do not intend to be restricted to the use of any particular type. As shown, the brake applying means comprises the telescopic shafts 37 and 38. These shafts are preferably composed of a metal or metallic alloy 38 having relatively low specific gravity, such as aluminous alloy.

The hollow shaft member 38 is pivoted at one end to a universal joint 39. The universal joint is connected with a stub shaft 40 which is journaled in an elongated bearing 41 carried by the chassis frame channel. To the interior end of the operating shaft there is keyed an operating lever 42. The shaft member 37 is bifurcated at 43, and is connected through these furcations to constitute the universal joint 44. The universal joint is connected, as shown, to an extension of the cam shaft 28 and lies within the prolongation of the axis of the king pin. To facilitate installation and replacement of the brake unit, the cam shaft may be made in any desired form.

While I have not shown the operating means for a rear wheel brake, it will be understood that any type may be employed. It is only necessary to provide a slot in the backing plate to allow for small movement of the brake cam shaft, hence any torque tube or brake plate mounting which will allow floating movement of the cam shaft may be utilized.

The levers which operate the cam shafts are connected through the brake rods 45 to the rock shaft 46. This rock shaft is journaled in bearings in the chassis frame and is rotated by the foot pedal 47 in the conventional manner. Each brake rod is provided with a take-up means, such as a turn buckle 48 positioned adjacent the rock shaft. By adjustment of the turn buckle the lengths of the brake rod may be varied in the well known manner.

As intimated hereinbefore, I contemplate applying the three shoes successively. My main concern is to bring the secondary shoe into frictional contact with the drum prior to the primary or servo shoe. I have found that a smooth braking action may be had by first bringing the reverse shoe 20 into contact with the drum and then applying the secondary shoe. If additional braking force is required, the servo shoe 18 may then be operated. It will be understood that this latter increase in braking action due to the operation of the servo shoe is a function of the speed of the drum itself.

This mode of operation, that is to say the successive application of the shoes, obtains in the structure that has been described when the spring 32 is made stronger than the spring 35. When there is no pressure applied to the foot pedal, the separate shoes are held in inoperative position against the eccentric stops 12, 13 and 14. The shoe 18 is withdrawn from the drum by the force of the tensioned spring 32. As this spring is positioned at one end of the shoe, the whole shoe tends to swing inwardly about its pivot 25. The limit of this return movement is determined by the eccentric 12 placed near the free end of the servo shoe. Concomitantly with this movement the shoe 19 and pivot 25 are constrained to move radially inwardly under the action of the spring 35. It will be noted that the lower end of the depending arm 34 of toggle member 27 is so positioned with relation to the pivot 25 that when pressure on the brake operating means is released, the spring 35 tends to force the toggle knee upwardly. This movement will shorten the toggle spread and withdraw the shoes 19 and 20 from the drum to the position determined by the stops 13 and 14. It will thus be seen that the whole brake, in effect, is drawn to its inoperative position by pivotal movement about the anchor pin 23.

When it is desired to operate the brake, the pedal 47 is depressed. This motion is transmitted through the rock shaft 46 and brake rods 45 to the brake applying means on each of the four wheels. If reference is made to Figs. 4 and 5, it will be seen that on rotation of the cam shaft 28 the cam is rotated out of its nested position within the toggle arm and comes in contact with the cam thrust surface 31. As the cam is further rotated the toggle knee 28 will move downwardly due to the fact that the effect of spring 32 is greater than that of the spring 35. As the toggle knee is displaced downwardly the pivot 24, which joins the shoe 20 and toggle arm 26, moves outwardly toward the braking flange. During the initial movement of the shoe 20, the shoe 19 is still maintined in its inoperative position against the eccentric stop 13. It will be perceived that the shoe 20 will be forced against the drum until the reaction of the applying force at the free end of the shoe 20 is equal to the force exerted by the spring 35. A further rotation of the cam 28 will then effect the radial movement of the unanchored end of the secondary shoe 19.

It is to be understood that the operation thus far described applies only to shoes 20 and 19, for the shoe 18 is still retained in its inoperative position by the force exerted by the spring 32. The retardation of the drum is, up to this point, obtained by two shoes which are brought into operation successively.

If a greater braking force is desired, the foot pedal may be further depressed. This additional depression of the pedal rotates the cam 28 through a greater angle of throw and not only applies additional force to the shoes 20 and 19 but, by reason of the ability of the cam shaft 28 to float, applies a reactive force to the shoe 18. When this reactive force becomes greater than that of the spring 32, the shoe 18 will then be forced towards the flange of the drum and sufficient additional rotation of the cam will cause frictional engagement of these members. The servo shoe on frictionally engaging the drum will tend to rotate with it. This shoe operating through the pivoted connection at 25 will load the secondary shoe. The amount of this additional brake applying force will depend primarily on the speed of rotation of the drum and the degree of frictional contact between the servo shoe and the drum. Now since the pedal is depressed against spring pressure, this second factor, like the first stages of application, is entirely within the control of the operator. It is therefore to be observed that the several phases of operation are each readily discernible to the operator. After shoe 20 has been set, the shoe 19 is forced into frictional contact with the drum only when the tension of the spring 35 is overcome. These movements are thus separably apparent. Similarly the shoe 18 moves into engagement with the drum only when the spring 32 is overcome. Then after the servo shoe has once been engaged with the drum, additional foot pressure will increase the frictional contact between the servo shoe and the drum, and such increase of contact will cause a greater servo movement and thereby increase the braking action.

It will be appreciated that the operation thus far described obtains only when the vehicle is moving forwardly and when the drum is rotating in a clockwise direction, as viewed in Fig. 4. This direction is designated by the arrow A. If the brake is applied when a vehicle is moving rearwardly the shoes 20, 19 and 18 will successively engage the drum and the braking effect will progressively increase, in the manner already described. However, in this case the shoe 18 will act primarily as a brake shoe and not as a servo shoe. Since the speed of the vehicle when moving rearwardly is not very great there is no real necessity for augmenting the braking force by utilizing the momentum of the vehicle. Power supplied by ordinary pedal pressures suffices for this purpose.

When the pressure on the pedal is relieved the shoes will be returned to inoperative position through the operation of the springs 32 and 35, in the manner already described. It is to be understood that the release of these shoes will be aided by the usual return spring attached to the brake pedal.

When it is desired to replace the brake unit, this may be accomplished by uncoupling the cam shaft section 28. This may be done by loosening the coupling hereinbefore described. The brake plate may then be removed and with it the complete shoe assembly by detaching the wheel and sliding the plate over the spindle.

It is highly desirable that the brake shoes should be accurately adjusted with respect to the brake drum. I propose to do this when the brake shoes are first mounted on the machine as well as subsequently when wear of these parts has occurred. It is a fact that much of the wear that takes place, particularly that due to the common practice of allowing the shoes to "wear in", is unnecessary and may be avoided by a careful initial adjustment.

To accomplish this purpose I provide what I term an adjusting drum. As shown in Fig. 9, this comprises essentially a peripheral brake flange 50 conforming in all its measurements to the flange of the brake drum which is actually carried by the wheel. This flange instead of being formed with a continuous flat plate, as in a drum of the usual construction, is supported by a plurality of radial arms 51 formed integral with the flange and with a central collar 52. In the initial adjustment operation the special adjusting drum is fitted over the stub shaft of the front wheel, as an example, and temporarily secured thereto in any convenient manner. It will be appreciated that with this type of drum the entire brake assembly is clearly visible to the person making the adjustment.

To adjust the brakes equally on all four wheels (or on each pair of wheels) the brake pedal 47 is depressed until a shoe 18 of one of the units engages its drum. It is to be understood, of course, that before this shoe engages the drum the shoes 20 and 19 come successively into engagement prior to the shoe 18. When it is determined which servo shoe first engages its respective drum flange, the brake rods 45 leading to each of the other brake units are then shortened by adjustment of the turn buckle until each shoe 18 on each wheel engages its cooperating drum. When this position is reached, each of the eccentrics 12 positioned beneath the several shoes 18 is rotated until it engages the channel flange of the shoe. Thereupon each eccentric is given the same reverse rotation, depending on the clearance desired, say for example one-half turn.

The pressure on the foot pedal is relieved and the pedal operation repeated for the shoes 19. Thus the pedal is again depressed until shoe 18 on one of the brakes has just left its coacting positioning pin 12. The pedal is fixed in this position and the eccentric pin 12 on each of the other three brakes is then rotated until there is a small clearance between it and its cooperating brake shoe 18, similar in amount to that on the first adjusted brake shoe. Shoes 19 on all of the brakes will then be engaged with their respective drums to the extent of the full force of their similarly tensioned springs 32, at the same point in the throw of the pedal. In a manner similar to the above operation, shoe 20 is now adjusted. The pedal is relieved and again depressed until shoe 19 on one of the brakes has just left its contiguous eccentric stop 13. The pedal is then fixed in this position and the eccentric 13 on each of the other three brakes is rotated until there is effected a similar small clearance between it and its respective shoe 19. It will thus be seen that the shoes 20 on all of the brakes will then be engaged with their respective drums with a force equal to that effected by the similarly tensioned springs 35, and such effect on each brake will obtain at a single definite position of throw of the foot lever.

It will now be apparent that on any operation of the pedal the shoes 20, 19 and 18 will successively engage the brake drum and all of the identical shoes will engage simultaneously. As the pedal is depressed all of the shoes 20 are forced into contact with the drums; as this depression is continued, all of the shoes 19 simultaneously contact with the rotating members and finally upon sufficient throw of the lever, all of the four shoes 18 simultaneously engage with the drum flanges.

After the friction facing on the shoes has worn to a considerable extent it becomes desirable to readjust the position of the shoes. This is particularly true in a servo brake composed of pivoted shoes where the secondary or loaded shoe, for obvious reasons, exerts the greatest braking pressure and is therefore subjected to great wear. In the brake assembly which I have described it is apparent that as the friction material on the shoes wears down, the drum clearance increases. Hence after an extended period of use a relatively greater throw of the foot lever is required to move the brake shoes into effective drum engagement.

This readjustment is similar to the initial adjustment requiring but one additional and preceding step. As has been described, the shoes 19 and 20 are anchored to the pin 23. This anchor pin is formed with an eccentric portion cooperating with the shoes 18 and 19. This eccentric section may be so formed that rotation of the eccentric shaft 11 in one direction will cause the heel of each of the shoes 19 and 20 to move toward the drum flange. It will be appreciated, of course, that in place of the one pin formed with different eccentric surfaces, I may provide two concentric shafts each having one eccentric portion. In this case one eccentric, for instance the one positioned adjacent the backing plate would be formed with a solid shaft fitting within and rotatable independently of the hollow shaft portion of the first eccentric. Each of the shaft sections would be provided with a means for insuring rotation, as by squaring the ends for the reception of a suitable tool. Each shaft section would also be provided with a means for locking the eccentric in any desired position of adjustment.

On adjustment of the eccentric 23, the shoes 19 and 20 would be displaced radially away from the center of the anchor until there was but a small clearance between the drum and the heels of these two shoes. The clearance between the separate shoes and the drum would then be obtained by the mode of adjustment hereinbefore described, that is to say, each similar shoe would be caused to simultaneously engage its respective drum at the same point in the throw of the applying lever.

By constructing the parts as I have described, I am enabled to accomplish a plurality of useful functions in the separate elements of this structure. Thus, the pin 23 not only serves as an anchor for the complete brake shoe unit, but it serves additionally to adjust the position of these elements. The stops 12, 13 and 14, in addition to determining the clearance of the separate shoes, prevents rattling of these by engaging their channel flanges. The shaft 28 at the one time serves both as a toggle knee and a cam shaft. By this adaptability of the elements to the performance of plural functions, I am enabled to greatly simplify the mechanical structure while accomplishing the many desired results outlined.

It is to be particularly noted that I have devised an applying means which operates on each shoe with a substantially radial thrust, which, as is known, is very effective. By placing the applying means without the circumferential plane of the shoes, I can utilize space for additional shoe length and thereby obtain the maximum shoe engaging surface.

If it is desired to obtain differential braking between the front and rear pair of wheels, this may readily be done. For example, after the brakes on the four wheels have been adjusted equally, if it is desired to apply the rear wheel brakes 49 prior to the front wheel brakes, the eccentric stops 12, 13 and 14 on the front braking plates are given equal turns in such direction as to increase the clearance between the shoes and drum. With this state of adjustment a given movement of the brake pedal will start to apply the rear brake shoes 19 before the result is effected to the same degree on the forward brake. It will be appreciated that by analogous adjustment the brakes of the forward wheels may be applied prior to the rear wheels.

Another method of accomplishing this same result is, after the four brakes have been adjusted equally, to release the turn-buckles on the brake rods leading to that set of brakes in which the braking action is to be last initiated. An additional method of accomplishing the differential braking on the front and rear pairs of brakes would be to adjust each brake independently for all four wheels, thereby accomplishing any degree of differentiation desired.

I prefer to so adjust the brakes that the shoes 19 on the rear wheels are first applied and a further movement of the pedal will simultaneously apply the secondary brake shoes on the rear wheel and the reverse shoes on the front wheels. In this way the danger of placing the front springs and axle under undue strains is avoided.

It may be desirable in some cases to apply the secondary shoe prior to the reverse and servo shoes. This may be accomplished, as shown in Fig. 11 by simply reversing the toggle so that the toggle member 27' attached to the shoe 20 carries the depending arm to which would be connected the return spring 35'. The straight toggle arm 26' is attached at one end to the pivot 25, associated with shoe 19, and at the other end to the cam shaft 28. With this structure, movement of the brake applying means will result first in a radial movement of the shoe 19, for the reason that there is less resistance to the movement of this member. Further movement of the brake applying means will result in overcoming the tension of the spring 35' and will apply the reverse shoe 20. Then a continuation of the brake applying movement, as in the other embodiments disclosed, will apply the servo shoe. During the initial movement of the shoe 19, the shoe 18 will also be subjected to a certain displacement, due to its positive connection through the pivot 25 to the shoe 19. This movement, however, will be substantially along the line of the toggle arm 26', the shoe 17 merely sliding on the cam and eccentric 12. To reduce friction caused by this movement, I may provide a roller at the thrust end of the cam 29 to engage the adjacent thrust surface on the shoe 18.

It will be appreciated that inasmuch as the spring which is connected to the servo shoe acts through a power multiplying means, the effect on the other shoes may be quite great while using a relatively light spring 32. Any desired effect can be obtained by proper regulation of the multiplication ratio and choice of springs as to desired strength. Hence, while the springs connected to shoes 18 and to the toggle arm are shown on the drawings as being of the same size, it is understood that I do not intend to be restricted to any particular relative sizes or strength of springs or design of the power multiplying means.

While I have shown and described the shoe assembly as being mechanically operated, it is evident that I may utilize a hydraulic mechanism, an example of which is shown in Fig. 8. This structure is similar to that shown in the other figures except that the cam 29 has been replaced by a fluid sylphon operator. The sylphon 53 is suitably mounted on the toggle by means of an apertured lug 54 on the bottom plate of the sylphon through which the pin 28' passes. The upper plate of the sylphon is also provided with a similar lug 55 which is pivoted to lug 56 on the servo shoe. A pin 57 passes through the apertures of the two lugs to pivotally connect the two. Coupled to the lower part of this sylphon is a fluid conduit (not shown) leading through an aperture in the backing plate to a suitable pedal operated valve mechanism.

The arrangement of the shoes and the relative strength and positions of the springs are generally similar to that in the mechanical embodiment shown particularly in Fig. 4. The spring 32' is suitably attached to the servo shoe 18' at one end and to the plug 33' at its other end. The plug 33', however, instead of being rigidly secured to the backing plate, as in the mechanical embodiment, is formed integral with an eccentric pin. This pin may be rotated to vary the tension of the spring 32' for a purpose to appear more fully hereinafter. Similarly the spring 35' is secured at one of its ends to an eccentric pin 36'. The other end of this spring is attached to the depending arm 34' of toggle member 27'.

When it is desired to operate this fluid brake, the pedal is depressed. This movement opens the main valve and causes a fluid flow in the conduit and sylphon. The pressure exerted in this member is expended first in applying the shoe 20' and as the pressure is increased the shoes 19' and 18' are applied in sequence.

To adjust the brakes of the hydraulically operated assembly, the operation is in general similar to that described for the mechanical embodiment, with the one essential difference that the adjustments in the brake assembly are made with respect to the springs instead of the positions of the brake shoes. This is due to the fact that the former involves only the extent of movement while the latter involves magnitude of hydrostatic pressure. For this reason it will be observed that I have provided the rotatable eccentrics 33' and 36' at the anchored ends of the springs, the rotation of which varies the tensions of the springs.

As the braking pressure is equal on all four wheels or on the two wheels of each pair, depending upon the relative sizes of the sylphons, the process of adjustment is somewhat simpler.

To adjust the brakes equally on all four wheels the brake pedal 47 is depressed until the shoe 18' on one of the four wheels (or on one of the pairs) engages its respective drum. While the pedal is maintained in this position and the shoes 18' on the other wheels are not yet in engagement, the eccentric 33' at the anchored end of spring 32' on each brake plate is turned, so that spring 32' will be released until its cooperating shoe 18' similarly engages its braking flange. The pedal is then released until the shoes 19' on all the wheels except one are clear of their respective drums and the remaining shoe 19' is just in contact with its braking flange. While the pedal is retained in this position the eccentrics 36' on each of the other brake plates are rotated in a direction to release the tension of the springs 35' on the other wheels, so that their respective shoes 19' will be likewise just in contact with their drums. The pedal is then further released until a reverse shoe 20' on one of the wheels (or the pair under adjustment) is just in contact with its drum. While the pedal is held in this position the positioning eccentrics 13' on the other three backing plates against which, it will be understood, each of the shoes 19' now rest, are rotated away from the shoes 19' until shoes 20' are each brought just in contact with its respective drum, similar to the fourth shoe 20' which first engaged the drum. It will thus be seen that the brake pedal is now at the position of its throw wherein the application of all of the brakes are simultaneously started. It is preferable, of course, that this should be as near as possible to the inoperative position of the brake applying pedal.

From the above it will be apparent that as the pedal is depressed each of the successive stages of braking on all four of the wheels will be simultaneously and equally effected.

It will be seen that I have devised a brake assembly comprising a plurality of shoes in which the shoes are operated sequentially, thereby insuring a uniform and evenly graduated braking action, selectively adapted to either one, two or all four wheels. I have further provided for an efficient utilization of the vehicle momentum for increasing the brake applying force after an initial retardation has taken place. All of these desirable results are attained by a structure which consists of but few parts. Most of these parts may be made of metal stampings and, as has been pointed out, may be easily interchanged and replaced.

I claim:

1. A brake comprising a plurality of anchored shoes and a servo shoe, and a sylphon operator connected to each of the shoes.

2. A brake comprising a plurality of anchored shoes and a servo shoe, a sylphon operator attached to the servo shoe and connected to the anchored shoes to operate the shoes sequentially.

3. In a brake assembly comprising servo, secondary and reverse shoes, a fluid operator operatively associated with the shoes means cooperating with the shoes to apply each of them in sequence.

4. In a brake assembly comprising servo, secondary and reverse shoes, a fluid operator operatively associated with the shoes means cooperating with the shoes to apply the reverse shoe prior to the secondary shoe.

5. In a brake assembly comprising servo, secondary and reverse shoes, a fluid operator operatively associated with the shoes means cooperating with the shoes to apply the reverse and secondary shoes prior to the servo shoe.

6. The method of braking a rotatable member comprising applying a retarding shoe to the rotatable member and subsequently applying a servo shoe to the rotatable member to thereby increase the total braking action.

7. In a brake shoe assembly including servo, secondary and reverse shoes, an operator, and means cooperating with the shoes to operate the secondary shoe prior to the reverse and servo shoes.

8. In a brake shoe assembly including servo, secondary and reverse shoes, means cooperating with the shoes to operate the secondary shoe prior to the reverse and servo shoes and to operate the reverse shoe prior to the servo shoe.

9. A hydraulically operated brake comprising a plurality of anchored shoes and an unanchored shoe, a sylphon pivotally connected to the shoes.

10. In a brake shoe assembly comprising servo, secondary and reverse shoes, a fluid operator operatively associated with the shoes means cooperating with the shoes to apply the reverse shoe prior to the servo shoe.

11. A brake assembly comprising servo, secondary and reverse shoes, a fluid operator operatively associated with the shoes means cooperating with the shoes to apply the reverse shoe prior to the servo and secondary shoes.

12. A brake comprising an unanchored shoe and a plurality of anchored shoes, a fluid operator operatively associated with the shoes, means to apply the anchored shoes prior to the unanchored shoe.

13. A brake assembly comprising an unanchored shoe and a plurality of anchored shoes, a sylphon operatively associated with the shoes means cooperating with the shoes to apply the anchored shoes prior to the unanchored shoe.

14. In a brake assembly including servo, secondary and reverse braking members, applying means for the shoes and means cooperating with the shoes and applying means to operate the secondary brake member prior to the reverse and servo members.

15. In a brake shoe assembly including a servo secondary and reverse shoes, applying means for the shoes and means attached to the shoes to cause the application of the secondary shoe to the drum prior to the application of the reverse shoe.

16. A method of retarding a rotatable member characterized by utilizing the momentum of the rotatable member to increase an independently pre-applied force on an anchored retarding member.

17. A method of retarding a rotatable member comprising the steps of positively applying an anchored retarding member to the rotatable member then applying another member to the rotatable member to thereby automatically increase the braking effect.

18. The process for retarding a rotatable member by cooperating internal expanding non-rotatable members characterized by the provision of successive limited engagements of the rotating member by the non-rotating members.

19. A method of retarding a rotatable member comprising the steps of first positively applying an anchored retarding member to the rotatable member a predetermined limited amount and then by increased applying force effecting an independent automatic increase of the braking effect.

20. A method of retarding a rotatable member comprising the steps of first positively applying an anchored retarding member to the rotatable member and then by further application utilizing, independently of the said first positive application, the momentum of the vehicle to increase the braking effect.

21. The method of retarding a rotatable member comprising applying an anchored retarding member a limited amount to the rotatable member and subsequently applying a servo member to the rotatable member.

22. The method of retarding a rotatable member comprising applying a plurality of anchored retarding members with predetermined limited amounts to the rotatable member and subsequently applying a servo member to the rotatable member.

JAMES H. VAN WAGENEN.